(12) United States Patent
Wyndon (10) Patent No.: US 9,599,132 B2
(45) Date of Patent: Mar. 21, 2017

(54) ANTI-ROTATION LUG FOR MOUNTING COMPONENTS TOGETHER

(71) Applicant: Rohr, Inc., Chula Vista, CA (US)

(72) Inventor: Lance Wyndon, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 10 days.

(21) Appl. No.: 14/642,237

(22) Filed: Mar. 9, 2015

(65) Prior Publication Data

US 2016/0265714 A1 Sep. 15, 2016

(51) Int. Cl.
| | |
|---|---|
| *F16B 1/00* | (2006.01) |
| *B64D 33/00* | (2006.01) |
| *F16L 59/12* | (2006.01) |
| *F16L 59/135* | (2006.01) |
| *F16L 3/237* | (2006.01) |
| *F16L 55/035* | (2006.01) |
| *H02G 3/32* | (2006.01) |

(52) U.S. Cl.
CPC ............... *F16B 1/00* (2013.01); *B64D 33/00* (2013.01); *F16L 3/237* (2013.01); *F16L 55/035* (2013.01); *F16L 59/12* (2013.01); *F16L 59/135* (2013.01); *H02G 3/32* (2013.01)

(58) Field of Classification Search
CPC ..... F16M 13/02; F16M 220/024; F16L 3/137; F16B 1/00
USPC ... 248/74.3, 229.2, 230.1; 411/85, 112, 182, 411/427, 966, 103
See application file for complete search history.

(56) References Cited

U.S. PATENT DOCUMENTS

| | | | |
|---|---|---|---|
| 2,406,415 A * | 8/1946 | Tinnerman | F16B 37/043 411/173 |
| 4,606,688 A * | 8/1986 | Moran | B60Q 1/0433 411/175 |
| 4,695,212 A | 9/1987 | Beresz | |
| 4,768,907 A | 9/1988 | Gauron | |
| 4,923,163 A * | 5/1990 | Harley | F16B 12/20 24/458 |
| 5,716,178 A | 2/1998 | Vu | |
| 7,059,816 B2 | 6/2006 | Toosky | |
| 7,114,900 B2 | 10/2006 | Toosky | |
| 8,312,726 B2 | 11/2012 | Wong et al. | |
| 8,905,693 B2 * | 12/2014 | Coffland | F16B 2/241 411/174 |
| 2010/0050643 A1 | 3/2010 | Snyder et al. | |
| 2011/0123323 A1 | 5/2011 | Ruberte Sanchez et al. | |
| 2011/0297758 A1 | 12/2011 | Ruberte Sanchez et al. | |
| 2012/0104747 A1 | 5/2012 | Ruberte Sanchez et al. | |
| 2014/0169908 A1 | 6/2014 | Wong | |

\* cited by examiner

*Primary Examiner* — Anita M King
(74) *Attorney, Agent, or Firm* — O'Shea Getz P.C.

(57) ABSTRACT

An assembly is provided for an aircraft propulsion system. The assembly includes an anti-rotation lug, a first mount, a second mount and a fastener. The anti-rotation lug includes a first curb and a second curb. The first mount is abutted against the first curb. The second mount is abutted against the second curb. The fastener connects the first and the second mounts to the anti-rotation lug, which lug is disposed between the first and the second mounts.

19 Claims, 8 Drawing Sheets

ANTI-ROTATION LUG FOR MOUNTING COMPONENTS TOGETHER

BACKGROUND

1. Technical Field

This disclosure relates generally to a mounting assembly and, more particularly, to an anti-rotation lug for mounting components together.

2. Background Information

A typical aircraft propulsion system includes a plurality of accessories, such as pumps, valves, actuators, generators, sensors, etc., associated with the gas turbine engine and the nacelle. These accessories may require a substantial number of electrical harnesses, oil lines, fuel lines, air ducts, etc. (for the purposes herein, these are all hereinafter termed "conduits") to be routed to and from them. Various design requirements may require the conduits to be secured at regular intervals along their length in order to ensure good support and prevent vibration, and may also require mounts that prevent the conduits from touching one another to ensure against heat transfer between them and in order to avoid chafing and/or striking each other and potentially causing damage. The design requirements may also require that certain conduits be positioned along an intended path or route. Various mounting assemblies are known in the art which may be utilized to locate the conduits relative to one another and ensure that the conduits are positioned along the proper path or route. While each of these mounting assemblies have certain advantages, there is still a need in the art of an improved mounting assembly.

SUMMARY OF THE DISCLOSURE

According to an aspect of the invention, an anti-rotation lug is provided that includes a base plate, a pair of first curbs and a second pair of curbs. The base plate extends lengthwise between a first end and a second end and depthwise between a first side and a second side. The first curbs are at the first end and project depthwise out from the first side. The first curbs and the base plate form a first channel. The second curbs are at the second end and project depthwise out from the second side. The second curbs and the base plate form a second channel.

According to another aspect of the invention, an assembly is provided for an aircraft propulsion system. This assembly includes an anti-rotation lug, a first mount, a second mount and a fastener. The anti-rotation lug includes a first curb and a second curb. The first mount is abutted against the first curb. The second mount is abutted against the second curb. The fastener connects the first and the second mounts to the anti-rotation lug, which lug is disposed between the first and the second mounts.

The base plate, the first curbs and the second curbs may be formed together in a monolithic body.

The base plate, the first curbs and the second curbs may be formed from metal.

The first channel may extend along a first centerline. The second channel may extend along a second centerline. The first centerline may be parallel with the second centerline.

The first channel may extend along a first centerline. The second channel may extend along a second centerline. An included angle between the first centerline and the second centerline may be acute.

The first channel may extend along a first centerline. The second channel may extend along a second centerline. The first centerline may be perpendicular with the second centerline.

The first curb may substantially prevent movement of the first mount relative to the anti-rotation lug. The second curb may substantially prevent movement of the second mount relative to the anti-rotation lug.

The anti-rotation lug may include another first curb. The first mount may be nested between the first curbs.

The anti-rotation lug may include another second curb. The second mount may be nested between the second curbs.

The anti-rotation lug may include another first curb and another second curb, and the anti-rotation lug may extend between a first end and a second end. The first curbs may be at the first end and project depthwise out from a first side to provide a first channel that receives the first mount. The second curbs may be at the second end and project depthwise out from a second side, opposite the first side, to provide a second channel that receives the second mount.

The first lug may longitudinally extend along a first centerline. The second lug may longitudinally extend along a second centerline. The first centerline may be parallel with the second centerline.

The first lug may longitudinally extend along a first centerline. The second lug may longitudinally extend along a second centerline. The first centerline may be angled relative to the second centerline.

A third mount may be abutted against the first curb. The fastener may connect the third mount to the anti-rotation lug.

A first conduit may be included for the aircraft propulsion system. A second conduit may be included for the aircraft propulsion system. The first mount may be configured as or include a P-clamp wrapped around the first conduit. The second mount may be configured as or include another P-clamp wrapped around the second conduit.

The foregoing features and the operation of the invention will become more apparent in light of the following description and the accompanying drawings.

DETAILED DESCRIPTION

Figure 1:
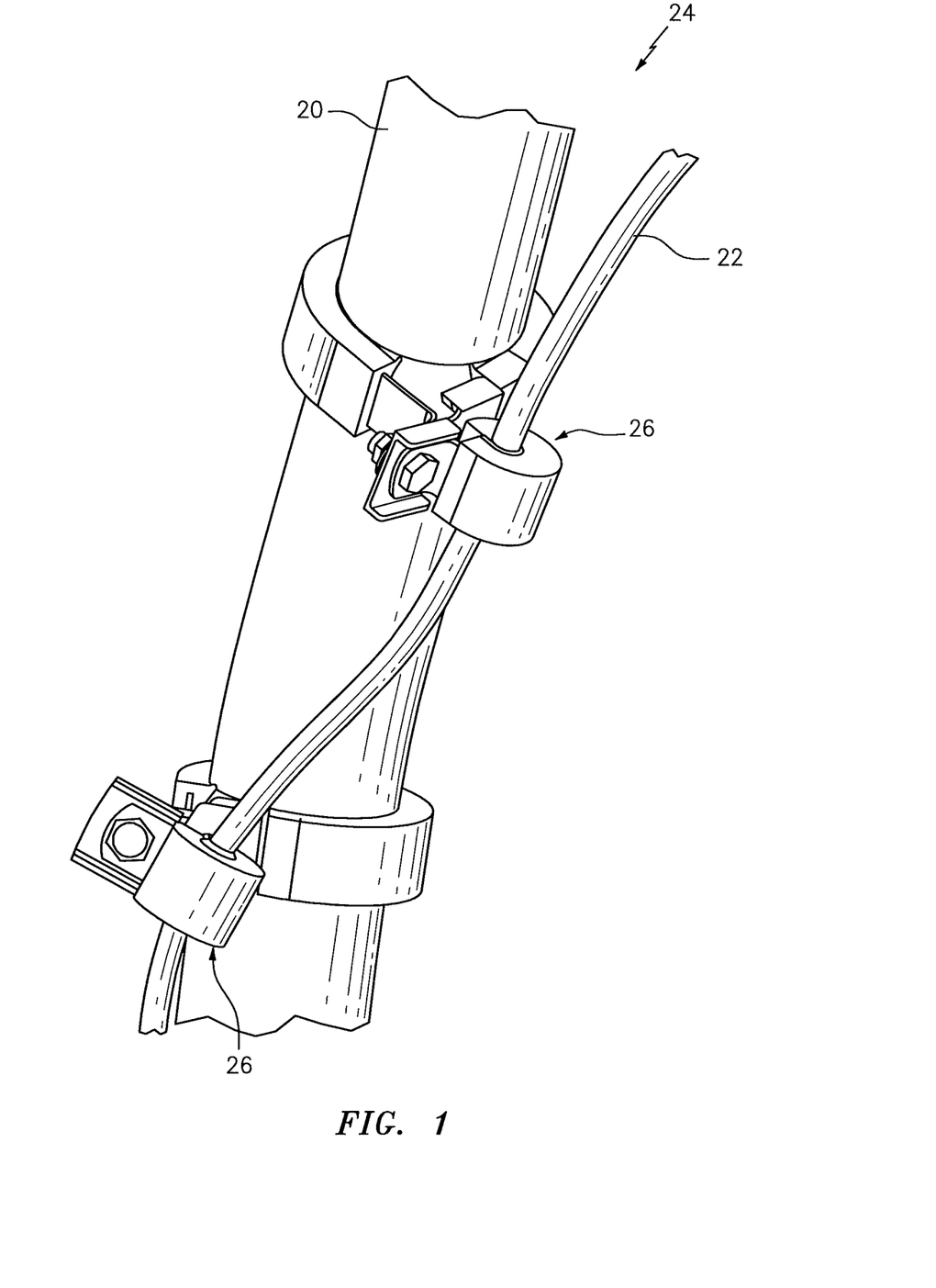
FIG. 1 is a partial illustration of an assembly for an aircraft propulsion system.

A system such as an aircraft propulsion system includes various components which may be disposed in close proximity to one another. A turbofan turbine engine, for example, may include a plurality of conduits 20 and 22 extending to and from accessories disposed within a structure or nacelle as illustrated in FIG. 1; e.g., within an interior cavity 24. Of course, these conduits 20 and 22 may alternatively be located elsewhere with respect to the turbine engine and/or its nacelle; e.g., within a cavity between a fan containment case and an outer fan nacelle. An example of the first conduit 20 is a hydraulic line; e.g., hose. An example of the second conduit 22 is an electrical line; e.g., wire harness. To maintain a distance between the first and second conduits 20 and 22 as well as prevent damage cause by rubbing between the conduits 20 and 22 and/or between the conduit(s) and another component(s), one or more mounting assemblies 26 are provided.

Figure 2:
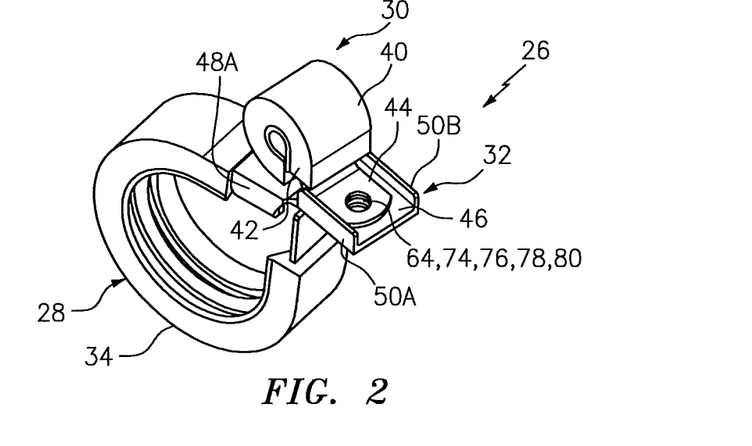
FIGS. 2-4 are illustrations of a mounting assembly included in the assembly of FIG. 1.
Figure 3:
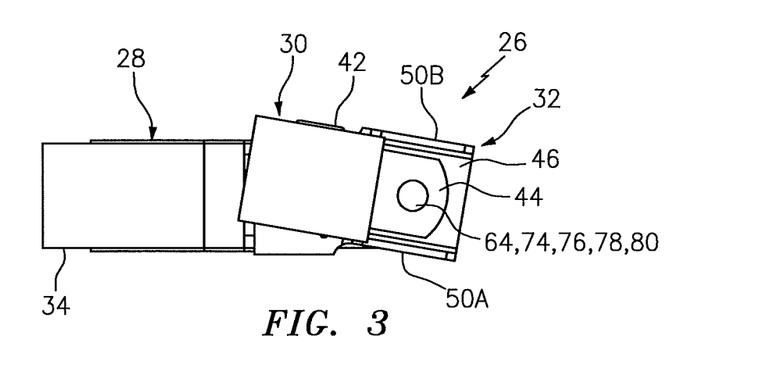
Figure 4:
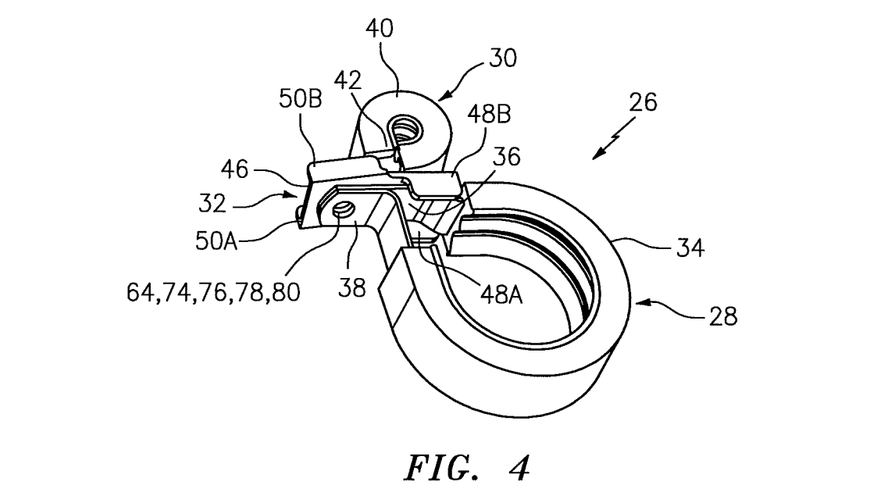

An exemplary embodiment of one of the mounting assemblies 26 is illustrated in FIGS. 2-4. While this mounting assembly 26 is described herein as mounting/positioning the conduits 20 and 22 together, the mounting assembly 26 may alternatively be configured to mount/position one or more other aircraft propulsion system components together. Furthermore, the mounting assemblies 26 of the present disclosure are not limited to aircraft propulsion system applications. Rather, one or more of the mounting assemblies 26 may be included, more generally, in other aircraft systems as well as with other, non-aircraft, systems.

Referring to FIGS. 2-4, each mounting assembly 26 includes a first mount 28, a second mount 30 and an anti-rotation lug 32. The first mount 28 may be configured as a clamp such as, but not limited to, a P-clamp. The first mount 28 of FIG. 4, for example, includes a generally annular hoop portion 34 which extends between a pair of mounting portions 36 and 38; e.g., mounting tabs. The hoop portion 34 may include a covering or insulation so as to reduce thermal conduction and/or transmission of vibrations between the first mount 28 and the first conduit 20 (see FIG. 1). The first mount 28 may be made of a flexible and/or resilient material such as metal so as to enable the mounting portions 36 and 38 to be pulled apart from one another such that the first mount 28 may be wrapped around the first conduit 20 (see FIG. 1). The mounting portions 36 and 38 may then be positioned next to one another and attached to the anti-rotation lug 32 as described below.

The second mount 30 may be configured as a clamp such as, but not limited to, a P-clamp. The second mount 30 of FIG. 2, for example, includes a generally annular hoop portion 40 which extends between a pair of mounting portions 42 and 44; e.g., mounting tabs (note: the mounting portion 42 is illustrated as below the mounting portion 44 in FIG. 2). The hoop portion 40 may include a covering or insulation so as to reduce thermal conduction and/or transmission of vibrations between the second mount 30 and the second conduit 22 (see FIG. 1). The second mount 30 may be made of a flexible and/or resilient material such as metal so as to enable the mounting portions 42 and 44 to be pulled apart from one another such that the second mount 30 may be wrapped around the second conduit 22 (see FIG. 1). The mounting portions 42 and 44 may then be positioned next to one another and attached to the anti-rotation lug 32 as described below.

Figure 5:
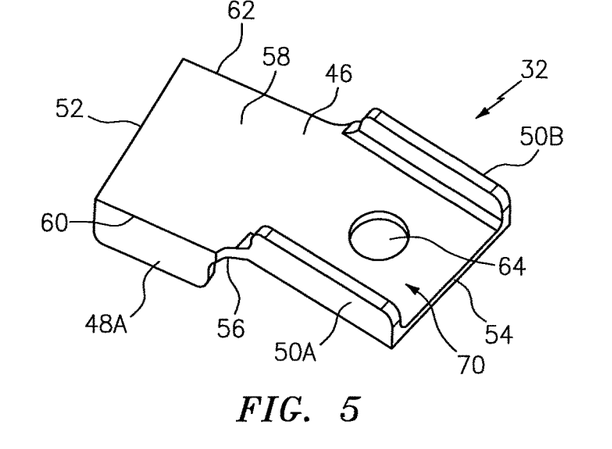
FIGS. 5-7 are illustrations of an anti-rotation lug included in the mounting assembly of FIGS. 2-4.
Figure 6:
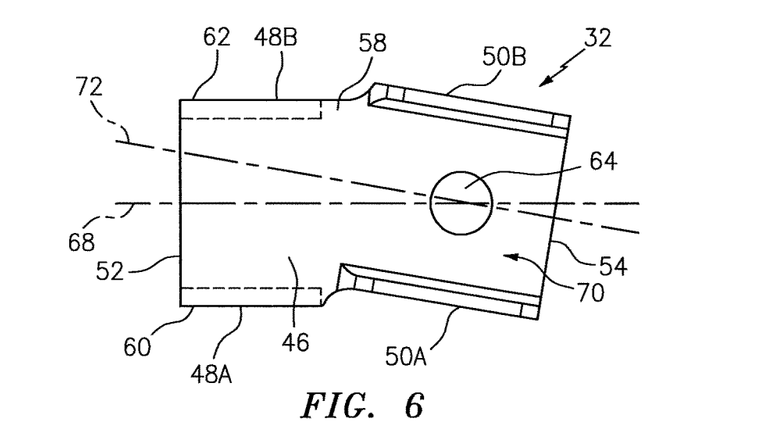
Figure 7:
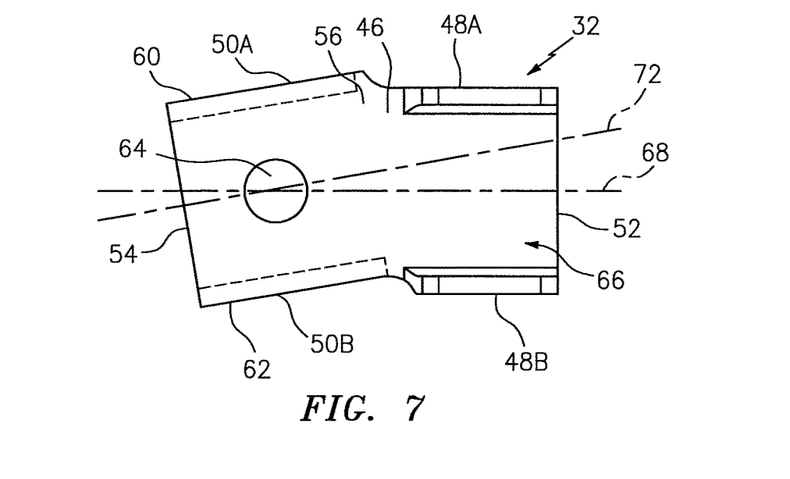

Referring to FIGS. 5-7, the anti-rotation lug 32 includes a base plate 46, one or more first curbs 48A and 48B and one or more second curbs 50A and 50B. The base plate 46 extends lengthwise between a first end 52 and a second end 54. The base plate 46 extends depthwise between opposing first and second sides 56 and 58. The base plate 46 extends widthwise between opposing third and fourth sides 60 and 62. The base plate 46 includes a fastener aperture 64 located between the third and the fourth sides 60 and 62 proximate the second end 54. This fastener aperture 64 extends depthwise through the base plate 46 between the first and the second sides 56 and 58.

The pair of first curbs 48A and 48B are located at the first end 52 and at the first side 56. The first curbs 48A and 48B, for example, extend lengthwise from the first end 52 respectively towards the second curbs 50A and 50B. One or more of the first curbs 48A and 48B may each have a length that is approximately thirty to sixty (e.g., forty) percent a length of the base plate 46. However, the present disclosure is not limited to any particular first curb 48 length. The first curb 48A is located at the third side 60. The first curb 48B is located at the fourth side 62. The first curbs 48A and 48B project depthwise out from the first side 56 to respective distal ends. In this manner, the first curbs 48A and 48B and the base plate 46 form a first channel 66 that extends along a first centerline 68. The first curbs 48A and 48B also extend parallel to the first centerline 68.

The pair of second curbs 50A and 50B are located at the second end 54 and at the second side 58. The second curbs 50A and 50B, for example, extend lengthwise from the second end 54 respectively towards the first curbs 48A and 48B. One or more of the second curbs 50A and 50B may each have a length that is approximately thirty to sixty (e.g., fifty) percent the length of the base plate 46. However, the present disclosure is not limited to any particular second curb 50 length. The second curb 50A is located at the third side 60. The second curb 50B is located at the fourth side 62. The second curbs 50A and 50B project depthwise out from the second side 58 to respective distal ends. In this manner, the second curbs 50A and 50B and the base plate 46 form a second channel 70 that extends along a second centerline 72. The second curbs 50A and 50B also extend parallel to the second centerline 72.

Figure 8:
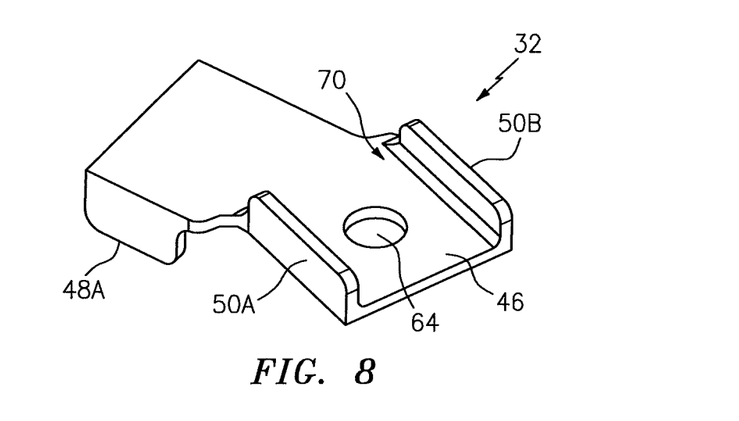
FIGS. 8-10 are illustrations of another anti-rotation lug.
Figure 9:
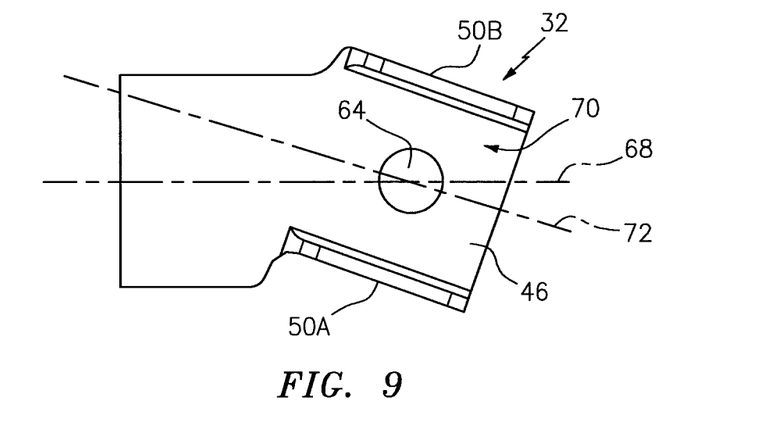
Figure 10:
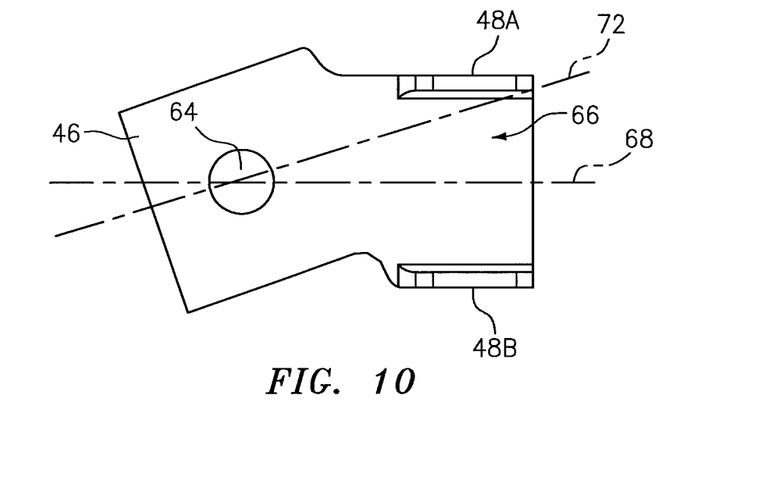
Figure 11:
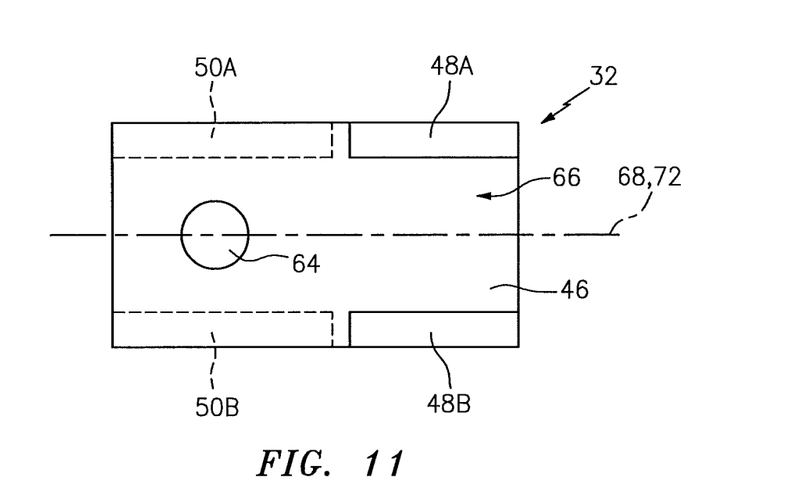
FIGS. 11 and 12 are illustrations of still other anti-rotation lugs.
Figure 12:
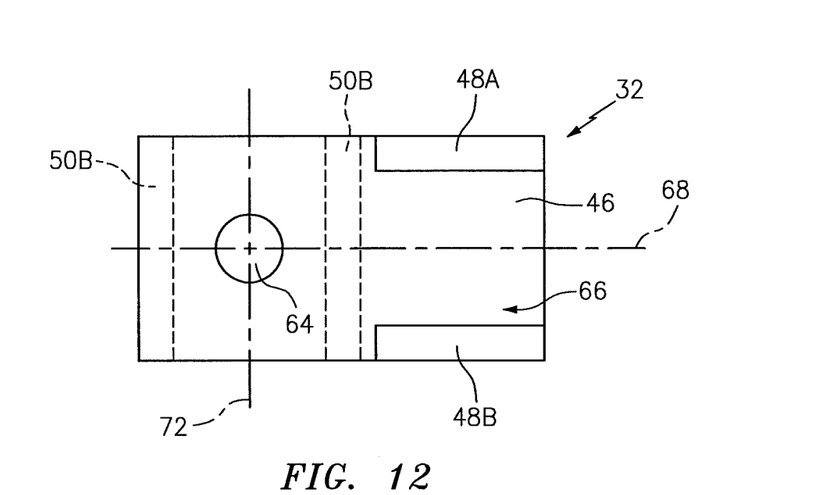

The second centerline 72 may be angled relative to the first centerline 68. For example, an included angle between the first and the second centerlines 68 and 72 in FIG. 6 is acute and, more particularly, approximately ten degrees. However, the present disclosure is not limited to such an embodiment. For example, the included angle may be approximately twenty degrees as illustrated in FIGS. 8-10, or any other angle greater than zero and less than ninety. Alternatively, the second centerline 72 may be approximately parallel to the first centerline 68 as illustrated in FIG. 11 or approximately perpendicular to the first centerline 68 as illustrated in FIG. 12.

The anti-rotation lug 32 may be formed from any material suitable to the environment in which it is located and the load to which it is subject. In the exemplary aircraft propulsion system application, the anti-rotation lug 32 is formed from metal. The anti-rotation lug 32 may be formed as a monolithic body; e.g., machined from a billet of material. However, the anti-rotation lug 32 of the present disclosure is not limited to any particular materials or formation techniques.

After the first and the second mounts 28 and 30 have been configured with (e.g., wrapped around or otherwise attached to) the first and the second conduits 20 and 22 as illustrated in FIG. 1, these mounts 28 and 30 are joined together using the anti-rotation lug 32. Referring to FIGS. 2-4, the first mount 28 is disposed between the first curbs 48A and 48B against the first side 56 (see FIGS. 5 and 7). The hoop portion 34 is disposed within the first channel 66 (see FIGS. 6 and 7). The mounting portions 36 and 38 are disposed such that respective fastener apertures 74 and 76 therein are aligned with the fastener aperture 64. The second mount 30 is disposed between the second curbs 50A and 50B against the second side 58 (see FIGS. 5 and 6). The hoop portion 40 is disposed within the second channel 70 (see FIGS. 5 and 6). The mounting portions 42 and 44 are disposed such that respective fastener apertures 78 and 80 therein are aligned with the fastener aperture 64.

Figure 13:
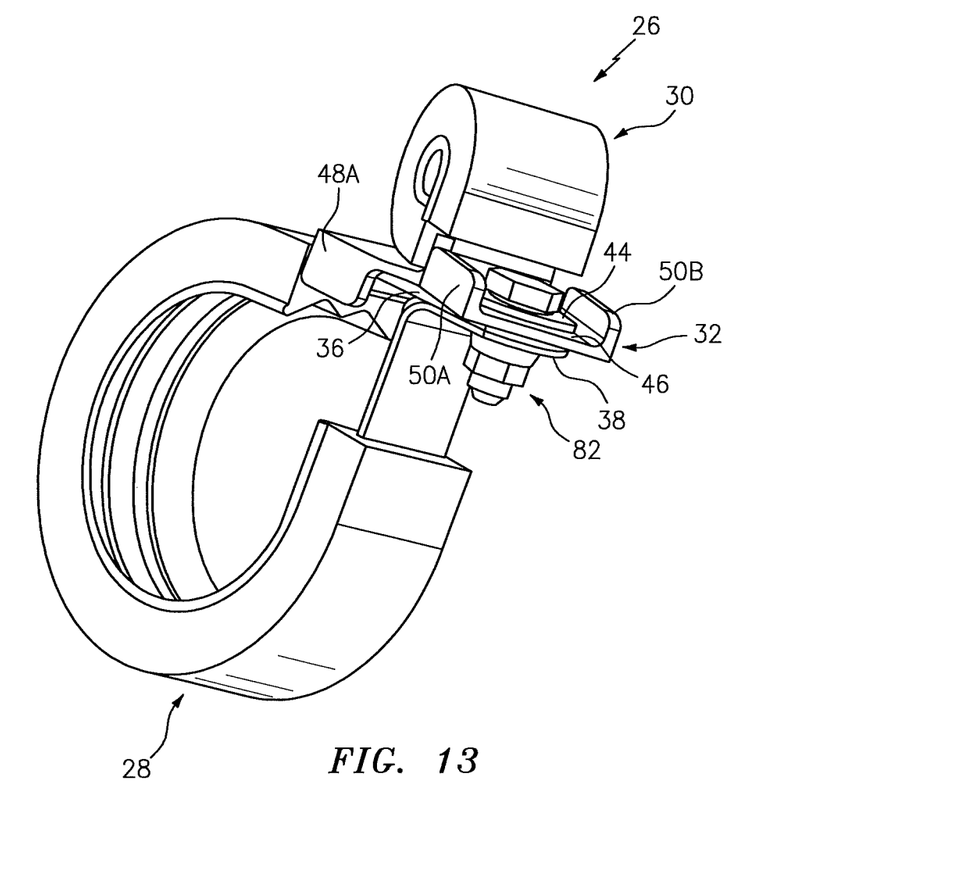
FIG. 13 is an illustration of the mounting assembly of FIGS. 2-4 configured with a fastener.

Referring to FIG. 13, a fastener 82 (e.g., a rivet, a bolt and nut, etc.) is mated with the fastener apertures 64, 74, 76, 78 and 80 (see FIGS. 2-4). In particular, the fastener 82 extends through the fastener apertures 64, 74, 76, 78 and 80 and secures the mounting portions 36, 38, 42 and 44 to the base plate 46. One or more of the first curbs 48A and 48B are located next to and may be abutted against the first mount 28, which thereby may limit or prevent rotation of the first mount 28 about an axis of the fastener 82. One or more of the second curbs 50A and 50B are located next to and may be abutted against the second mount 30, which thereby may limit or prevent rotation of the second mount 30 about the axis of the fastener 82. In this manner, the assembly of mounts 28 and 30 and anti-rotation lug 32 may locate the conduits 20 and 22 relative one another as well as limit or prevent relative motion between the conduits 20 and 22. The assembly of mounts 28 and 30 and anti-rotation lug 32 may also ensure the conduits 20 and/or 22 runs along intended routing pathways as a result of the fixed angle between the centerlines 68 and 72.

Figure 14:
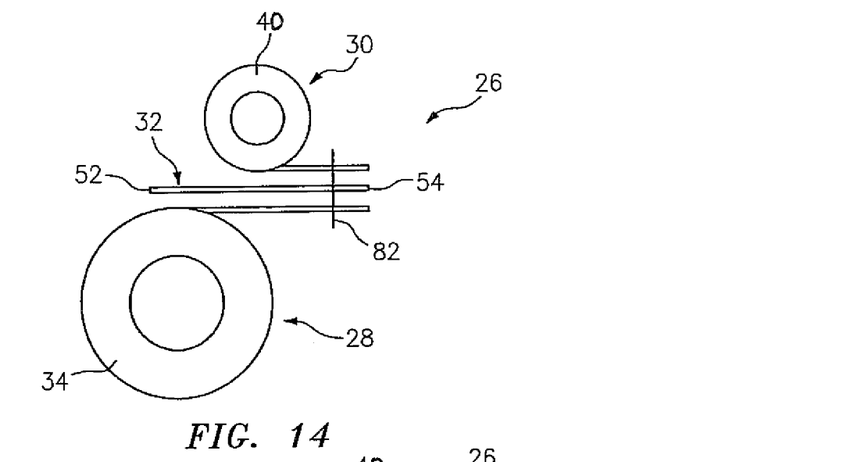
FIGS. 14-17 are schematic illustrations of other mounting assemblies.

Referring to FIG. 14, in some embodiments, the first and the second mounts 28 and 30 may be facing the same direction. For example, the hoop portions 34 and 40 may project towards and/or out from the first end 52.

Figure 15:
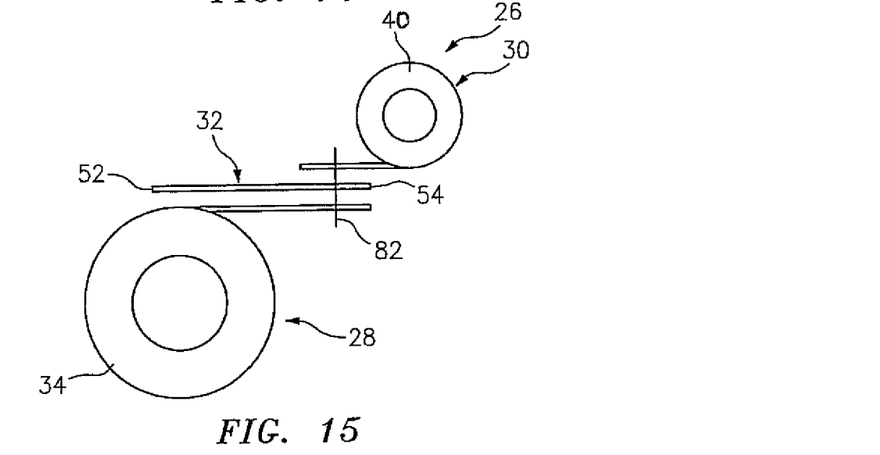
Figure 16:
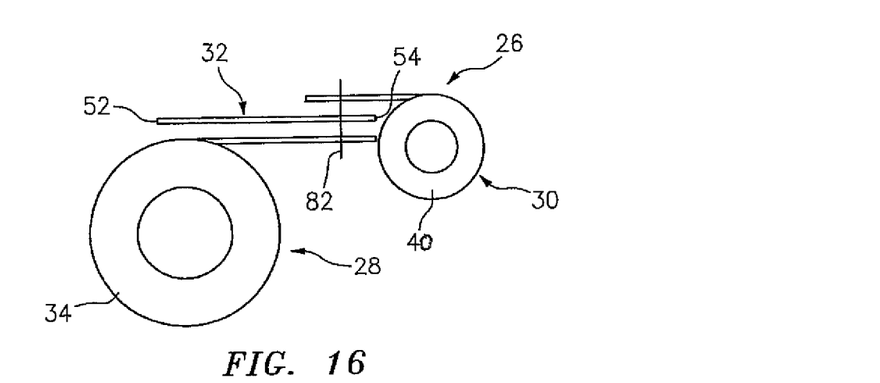

Referring to FIGS. 15 and 16, in some embodiments, the first and the second mounts 28 and 30 may be facing the opposing directions. For example, the hoop portion 34 may project out from the first end 52 whereas the hoop portion 40 may project out from the second end 54. In FIG. 15, the hoop portions 34 and 40 of the mounts 28 and 30 extend from the anti-rotation lug 32 in opposing directions. In FIG. 16, the hoop portions 34 and 40 of the mounts 28 and 30 extend from the anti-rotation lug 32 in the same direction.

Figure 17:
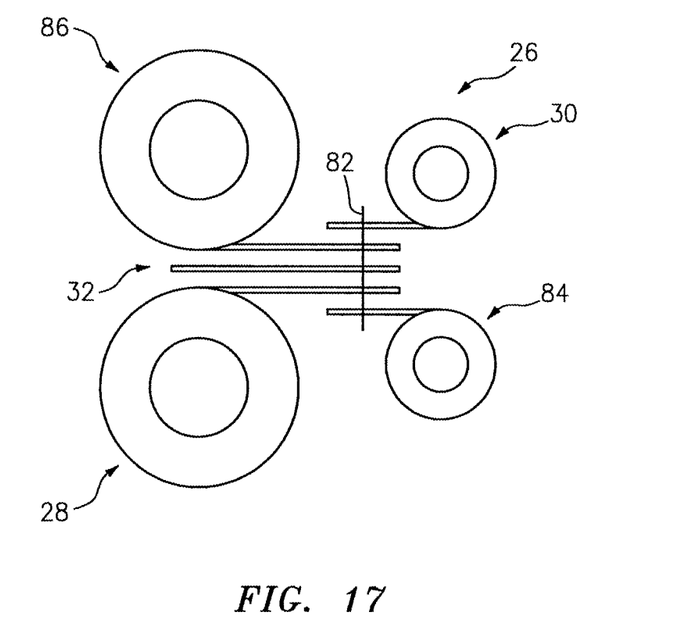

Referring to FIG. 17, in some embodiments, one or more additional mounts 84 and/or 86 may be secured to the anti-rotation lug 32. One or more of these additional mounts 84 and/or 86 may each have a similar configuration as the mounts 28 and 30. One or more of the additional mounts 84 and 86 may each be secured to the anti-rotation lug 32 by the single fastener 82; however, additional fasteners may also be included.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. An anti-rotation lug, comprising:
a base plate extending lengthwise between a first end and a second end and depthwise between a first side and a second side;
a pair of first curbs at the first end and projecting depthwise, in a first direction, out from the first side, wherein the first curbs and the base plate form a first channel; and
a pair of second curbs at the second end and projecting depthwise, in a second direction, out from the second side, wherein the second curbs and the base plate form a second channel, and wherein the second directions is parallel and opposite the first direction.

2. The anti-rotation lug of claim 1, wherein the base plate, the first curbs and the second curbs are formed together in a monolithic body.

3. The anti-rotation lug of claim 1, wherein the base plate, the first curbs and the second curbs are formed from metal.

4. The anti-rotation lug of claim 1, wherein the first channel extends along a first centerline, the second channel extends along a second centerline, and the first centerline is parallel with the second centerline.

5. The anti-rotation lug of claim 1, wherein the first channel extends along a first centerline, the second channel extends along a second centerline, and an included angle between the first centerline and the second centerline is acute.

6. The anti-rotation lug of claim 1, wherein the first channel extends along a first centerline, the second channel extends along a second centerline, and the first centerline is perpendicular with the second centerline.

7. The anti-rotation lug of claim 1, wherein the base plate is a flat plate.

8. An assembly for an aircraft propulsion system, comprising:
an anti-rotation lug including a first curb and a second curb;
a first mount abutted against the first curb;
a second mount abutted against the second curb; and
a fastener connecting the first and the second mounts to the anti-rotation lug which is disposed between the first and the second mounts;
wherein the first curb substantially prevents movement of the first mount relative to the anti-rotation lug; and
wherein the second curb substantially prevents movement of the second mount relative to the anti-rotation lug.

9. The assembly of claim 8, wherein the anti-rotation lug further includes another first curb and the first mount is nested between the first curbs.

10. The assembly of claim 9, wherein the anti-rotation lug further includes another second curb and the second mount is nested between the second curbs.

11. The assembly of claim 8, wherein
the anti-rotation lug further includes another first curb and another second curb, and the anti-rotation lug extends between a first end and a second end;
the first curbs are at the first end and project depthwise out from a first side to provide a first channel that receives the first mount; and
the second curbs are at the second end and project depthwise out from a second side, opposite the first side, to provide a second channel that receives the second mount.

12. The assembly of claim 8, wherein the first mount longitudinally extends along a first centerline, the second mount longitudinally extends along a second centerline, and the first centerline is parallel with the second centerline.

13. The assembly of claim 8, wherein the first mount longitudinally extends along a first centerline, the second mount longitudinally extends along a second centerline, and the first centerline is angled relative to the second centerline.

14. The assembly of claim 8, further comprising a third mount abutted against the first curb, wherein the fastener further connects the third mount to the anti-rotation lug.

15. An assembly for an aircraft propulsion system, comprising:
an anti-rotation lug including a first curb and a second curb;
a first mount abutted against the first curb;
a second mount abutted against the second curb;

a fastener connecting the first and the second mounts to the anti-rotation lug which is disposed between the first and the second mounts;

a first conduit for the aircraft propulsion system; and a second conduit for the aircraft propulsion system;

wherein the first mount comprises a P-clamp wrapped around the first conduit, and the second mount comprises another P-clamp wrapped around the second conduit.

16. The assembly of claim 15, wherein the anti-rotation lug further includes another first curb and the first mount is nested between the first curbs.

17. The assembly of claim 15, wherein the anti-rotation lug further includes another first curb and another second curb, and the anti-rotation lug extends between a first end and a second end;

the first curbs are at the first end and project depthwise out from a first side to provide a first channel that receives the first mount; and the second curbs are at the second end and project depthwise out from a second side, opposite the first side, to provide a second channel that receives the second mount.

18. The assembly of claim 15, wherein the first mount longitudinally extends along a first centerline, the second mount longitudinally extends along a second centerline, and the first centerline is parallel with the second centerline.

19. The assembly of claim 15, wherein the first mount longitudinally extends along a first centerline, the second mount longitudinally extends along a second centerline, and the first centerline is angled relative to the second centerline.

* * * * *